United States Patent [19]

Schael

[11] 4,105,282
[45] Aug. 8, 1978

[54] OPTICAL SIGHT

[76] Inventor: Rudi Schael, Kandinskystrasse 27, D-8000 Munich 71, Fed. Rep. of Germany

[21] Appl. No.: 707,493

[22] Filed: Jul. 22, 1976

[30] Foreign Application Priority Data

Jul. 23, 1975 [DE] Fed. Rep. of Germany ....... 2532930

[51] Int. Cl.² .............................................. G02B 27/32
[52] U.S. Cl. ........................................ 350/10; 350/29; 350/201; 356/247
[58] Field of Search ......................... 33/245, 247, 248; 350/10, 27, 29, 201, 212; 354/219, 222, 224; 356/247, 251

[56] References Cited

U.S. PATENT DOCUMENTS 3,642,341  2/1972  Seitried ............................ 356/247 X
3,942,901  3/1976  Ekstrand ............................. 356/251

FOREIGN PATENT DOCUMENTS 269,447  1/1914  Fed. Rep. of Germany ........... 356/251

Primary Examiner—John K. Corbin
Assistant Examiner—Matthew W. Koren
Attorney, Agent, or Firm—Hauke and Patalidis

[57] ABSTRACT

An optical sighting device for firearms, more particularly hand guns and the like, geodesic instruments and the like comprising a telescope-type optical system with an objective and an ocular, or eyepiece, element and provided with a target mark, such as a reticle, positioned within the optical system, which is projected onto infinity, such as to be seen in the same plane as the plane of viewing of the target. The optical system consists of a massive cylindrical lens body of transparent material which has its opposite end surfaces formed as optically effective surfaces of symmetrical curvature, the surface of the objective being convex for converging the parallel light rays emitted from the target, and the surface of the ocular being concave for re-aligning the transmitted light rays to a beam of parallel rays. The target mark, or reticle, is disposed on the surface of the ocular element, and an image of the target mark is reflected and enlarged by the surface of the objective, such surface being provided with a semi-transparent mirror surface.

19 Claims, 5 Drawing Figures

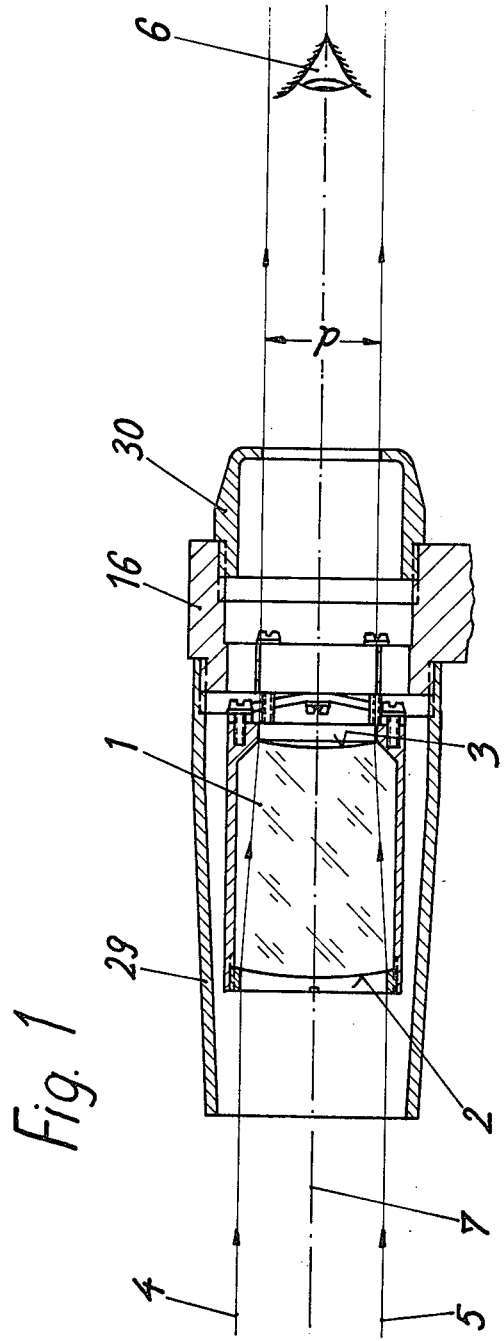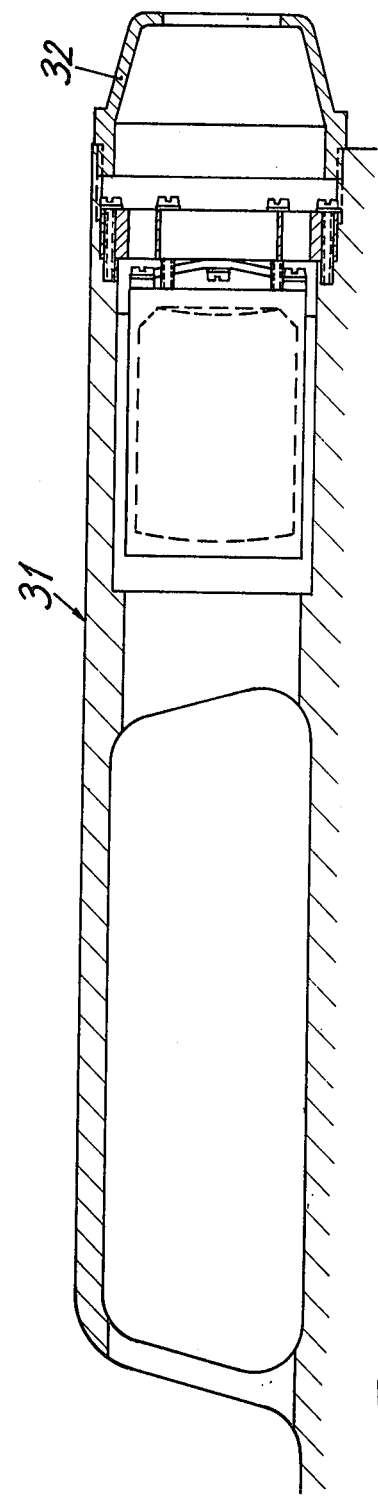

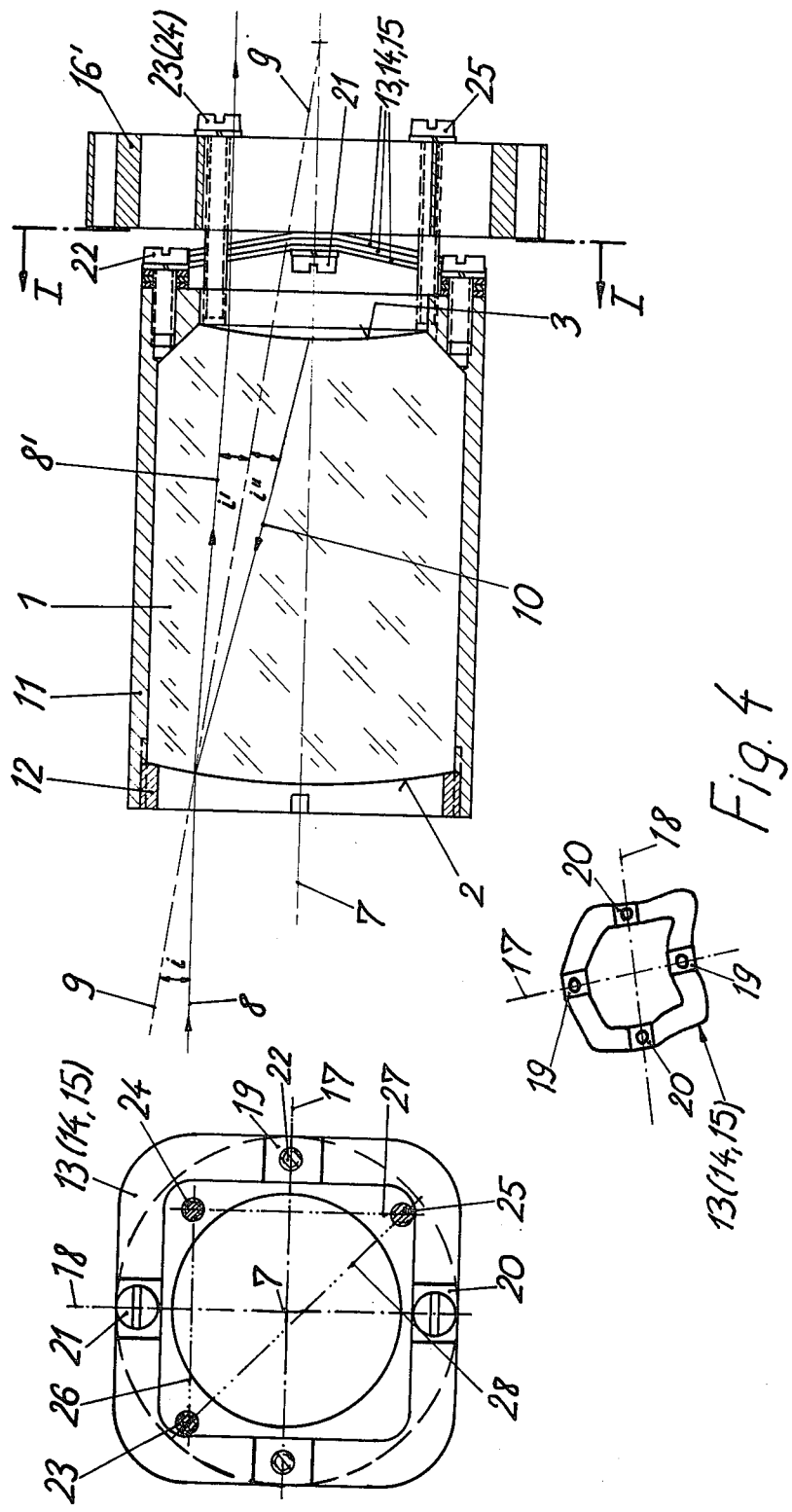

OPTICAL SIGHT

BACKGROUND OF THE INVENTION

The present invention relates to sighting devices for aligning firearms, geodesic instruments, such as transits, and the like, with a target, accurately and rapidly.

Sighting devices are known such as the pointer sights system which is commonly used for aiming firearms at a target situated at a medium or short distance. Sighting devices of this kind consist of a short rod or pointed projection, or front sight, and of a horizontal, vertically adjustable metallic part with a V-groove, or rear sight, which are both mounted on the weapon or other instrument so that the user sights through the rear sight onto the front sight, and aligns the two sights with the target. In this manner, the eye of the user must be aligned with the rear sight, the front sight and the target, all situated exactly on a single straight line, the so-called target line, or alignment of the instrument with the target is not possible. Such exact alignment of the eye with the target line takes a certain amount of time, proper concentration and adequate skill on the part of a marksman. For this reason, conventional pointer sights systems cannot be used with adequate accuracy by the average person. In addition, accuracy is hampered because the eye is focused to the far-away target, such that the rear and the front sights are seen as out-of-focus blurred images. This disadvantage of pointer sights systems may be reduced by placing the sights as far away from the eye as possible, which can be done only with relatively long firearms, or other devices having a long sight line. In addition, the distance separating the rear and the front sights must be as wide as possible for the sake of better accuracy. This is in contradiction with the requirement of a long distance from the rear sight to the eye, and it is limited by the design length of the firearm or other device. Finally, another disadvantage associated with pointer sights systems is that only the upper half of the target is visible since the lower half of the target is masked by the rear and front sights. This results in a considerable reduction of the overall visibility of the target.

Another well-known sighting device is a modification of the pointer system which is sometimes known under the name "Diopter." In such modification, the rear sight is replaced by an apertured wall or mask which is disposed proximate the eye of the person aiming at the target. The tip of the front sight is viewed through this aperture and aligned with the target. In this manner, an improved accuracy may be achieved as compared to the conventional pointer sights system, because the closeness of the aperture to the eye provides a longer distance to the front sight. However, since the aperture must have a very small diameter, for reasons of accuracy, the field of vision through the aperture is considerably restricted, which in turn considerably reduces the visibility of the target.

Sighting devices of higher accuracy, of the telescope type, often called telescopic sights are also known. At the point of view of their optical design, telescopic sights are terrestrial telescopes which, in addition to the objective forming an intermediate image plane and of the ocular, require an additional lens which, through a further projection of the intermediate plane image, effectuates a reconstruction of the image. In one of the two intermediate images, that is between the objective lens and the additional lens, or between the additional lens and the ocular, an adjustable target mark, called a graduated plate, is inserted which is provided with a reticle which is seen through the ocular in the same plane as the target plane. Consequently, the optical characteristics of the ocular, or eyepiece, must be calculated such as to provide an exit pupil situated as far back as possible in order to keep the distance between the eye and the telescopic sight as large as feasible in order to avoid eye injuries due to weapons having a heavy recoil. Telescopic sights have generally a 6× magnification and are thus particularly suited for sighting far-away targets. One of their disadvantages, however, which is due to the substantial magnification, is that only a small section of the target is visible. Thus, the field of view is severly restricted, which is even more important when the target is at a medium or short distance, such that telescopic sights are not particularly well suited for aiming at targets at such medium or short distance. In addition, telescopic sights, due to their optical system design, are expensive and have a barrel which is quite long because of the extended image reversal optical system. An additional disadvantage of telescopic sights is that the black reticle on the graduated plate can only be seen with great difficulty when superimposed on dark targets. Moreover, because of the high magnification and the correspondingly magnified errors due to misadjustment, telescopic sights must be repeatedly re-adjusted with precision.

In addition to the already mentioned disadvantages, the prior art devices described hereinbefore have an important common deficiency. In addition to the requirement that the weapon or other instrument be correctly aligned with the target, it is necessary for the viewer to bring his eyes into the target line with the greatest precision possible in order to judge good aiming. Faulty alignment of the eye is often judged as a sighting error, while the sighting system should not be blamed, which obviously does not mean that sighting errors do not indeed occur.

The mentioned disadvantages due to misalignment of the eye with the target line does not, however, exist with another prior art sighting device disclosed in German Pat. No. 269,447. In this prior art sighting device, the lens barrel which encloses the optical system is so designed that the semi-transparent mirror surface reflecting the target mark is disposed at a considerable distance from the convex optically effective surface in the interior of the lens barrel. The mirror surface is itself curved, its curvature being different from that of the two optically effective surfaces. Because the semi-transparent mirror surface is disposed within the interior of the lens housing, the lens housing is divided into two sections which, for defining this mirror surface as a glass-air surface, are simply joined together by means of an adhesive so as to define the mirror surface, or they can be fused together.

Because of the arrangement consisting of the semi-transparent mirror surface being disposed within the lens itself, there results a complication of the computing of the lens characteristics, resulting in turn in excessive manufacturing costs. Such disadvantage is further compounded because such sighting devices have applications not only in firearms but in photographic equipment, and those devices are manufactured in mass production for which even a slight increase in manufacturing costs has deep economic ramifications.

The present invention accomplishes the results of providing a simple and effective optical sighting device which in addition to being suitable for long distances is also suitable for medium or short distances, which does not present the disadvantages of the prior art sighting devices, and which is also very favorably priced as compared to the cost of manufacturing the prior art sighting devices.

Those objects are accomplished by the present invention as a result of providing an optical sighting device comprising a single lens massive body having one of its optically effective end surfaces provided with a partially transparent and partially reflective coating.

Although the optical sighting device of the present invention is of simple design, it still provides accurate aiming. The whole optical system consists of a single body of glass or other light transmissive material, the single body being provided with opposite optically effective surfaces. The optical surfaces are preferably spherical or rotation-symmetrical, for the sake of simplified manufacturing, but they can, nevertheless, be also developed as aspherical surfaces. A first effective surface, which is optically convex, concentrates the light rays in the fashion of an objective lens for forming an image, and the second, concave, optically effective surface deflects the light prior to formation of the image into infinity, in the same manner as an eyepiece, such as to fulfill the operation of telescope optical elements. The optical sighting device of the invention is therefore a telescope of the simplest design, which can be manufactured at the most modest costs and which is, so to speak, a simplified type of the Galileo, or Dutch-type, telescope which, as is well known, delivers a terrestrial or erect image. Thus, the present invention does not require an additional image reversing lens system. Due to the relatively low magnification of the telescope type sighting system of the invention, the human eye naturally and easily adjusts for varying distances, such that special precise focusing elements are not necessary. In addition, possible eventual misadjustments have less effect upon the human eye in view of the low magnification of the telescope. As a result of the reduced magnification, an added advantage is that the field of view under which the target is sighted is relatively wide, which results in being able to rapidly locate the target and aim at the target. Finally, the sighting device of the invention makes it possible, as long as the optically effective surfaces are of good quality, to view in a single plane the target and the target mark.

Compared to the device disclosed in German Pat. No. 269,447, the sighting device of the invention, due to using a solid mass of glass or other material for the optical system from effective optical surface to effective optical surface in which the two frontal surfaces are arranged to have respectively the target mark and a semi-transparent coating, presents the advantage of considerably simplifying the calculation of the lens system and of reducing the cost of manufacturing. Also, by eliminating the requirement of separate, curved semi-transparent mirror surfaces on the interior of the lens body, there results a reduction of possible sources of error either in calculation or in production.

Because of the particular advantageous arrangment of the optical system of the invention, the lens frontal surfaces have a curvature of such kind and are situated at an appropriate distance from each other with the result that the light rays reflected by the target mark upon reflection upon the first surface are reflected in such a way that they merge with the rays originating from the target which are refracted by the first optical surface.

As is known, Galileo type telescopes do not provide an intermediate image with the aid of which a target mark could be projected into infinity. However, by the arrangement provided by the present invention, this is obtained in an especially simple way such that the second optically effective surface, besides its light refracting function, serves simultaneously as the support for the target mark, made of reflective material, and that the optically effective first surface is made semi-reflective by means of an appropriate coating. In such manner, the surface acts as a reflective surface at the same time as acting as a refractive surface for the light rays. The two optically effective surfaces thus have a double function which considerably reduces the number of optically effective components. By choosing an appropriate distance between the two surfaces, i.e., by choosing an appropriate actual thickness of the lens body, it is possible to have the target mark projected to infinity simultaneously with obtaining the optical telescope effect, such that the viewer sees the target and the target mark clearly in a single plane. Fulfilling both requirements is possible for every light refracting medium at a certain magnification, for example, for crown glass the magnification factor is $1.26\times$. In this manner, the target mark is observed with a magnification corresponding to an ordinary magnifying glass, whereby the focal length of the magnifying glass results from the predetermined dimensions between the reflecting first surface and the light defracting second surface, and is thus dependent upon the actual length of the lens mass. In the above mentioned example of using crown glass, with a thickness of glass of 30mm between the first and second surfaces a magnifying glass magnification of $10.5\times$ results for the target mark. The target mark, or reticle, therefore needs to be provided on the second optically effective surface only in a relatively small size. Consequently, the target mark causes very little interference with sighting through the second surface, and therefore provides only a negligible loss of brightness since it is of relatively small overall size and the lines forming the reticle, or other target mark, are only a few hundredths of a millimeter in width. Finally, the reflected target mark appears to be bright relative to the light surrounding the target, which considerably improves the visibility of dark targets especially at night or at dusk.

Another advantage of the present invention is that the two optically effective surfaces have such curvature and are situated at a distance from each other such that the diameter of the exit pupil is larger than that of the pupil of the human eye. For practical purposes, the diameter of the exit pupil is in the range of 15 to 25mm, preferably 20mm.

The particularly wide exit pupil obtained by the present invention which results from, among other factors, the relatively small telescope magnification, provides very important advantages in an optical sight. Since the light originating from the target placed at infinity, after passage through the second optically effective surface emerges over the full diameter of the exit pupil parallel to the optical axis, the human eye does not have to be positioned with precision, either radially or axially. It is sufficient if the eye is located within the bundle of parallel rays emerging through the wide exit pupil. Thus, precise alignment of the eye with the target line is not required. In this respect, particularly important advantages are provided by the present invention as compared with prior art sighting devices. Aiming is rendered considerably easier and, most of all, requiring much less time and concentration. This is particularly important for firearms since it is evident that such a simplified, rapid and accurate aiming procedure, in view of the great visibility of the target as provided by the invention, is of utmost importance, especially for a chance for survival in man-to-man combat. It has also advantages for other applications, such as for geodesic transits, such advantages taking place during the aiming procedure.

In order to compensate for spherical aberration within the lens mass itself, according to the present invention, the distance between the first and second optically effective surfaces is preferably determined such that the deviation angle of any single ray over the entire diameter of the exit pupil at least at three points, especially at the optical axis and on two diametrically opposed points located at the outer limit of the exit pupil, is zero and negligibly small for any intermediary points. A relatively high precision in the parallelism of the light rays exiting through the exit pupil can be obtained with aspherical, or rotation symmetrical, optically effective surfaces. But it must be taken into consideration that obtaining aspherical surfaces with the inherent required precision desired involves correspondingly high accuracy in grinding the lens surfaces with resulting high cost in labor and production costs. Consequently, according to the present invention, spherical and optically effective lens surfaces are used which can be obtained with very high precision, but by much simpler methods than aspherical surfaces. Since the spherical surfaces, however, are optically accurate only proximate to the optical axis while showing increasing refraction errors proportionally to the distance from the optical axis toward the periphery of the lens system, increasing with the distance from the optical axis, such errors being both errors in deflection of the light beam as well as, more importantly yet, reflection errors, a corresponding correction becomes necessary. The correcting factors for the image producing errors, or aspherical aberrations, are preferably obtained by means of proper design. Consequently, the exact locations of the points of zero deviation over the diameter of the exit pupil are chosen such that the deviation errors between the zero points are smaller than the resolution factor of the human eye, as well as smaller than the scatter range, especially of hand firearms, and thus negligible. It should be also appreciated that the lens body, according to this invention, in the same manner than prescription eyeglasses, may show some chromatic aberrations which do not result in refraction.

An additional advantage of the present invention results from the fact that the lens body, preferably enclosed in a cylindrical housing, whether mounted at the rear of a firearm barrel, or in a geodesic instrument or the like, is spring mounted by means of one or several parallelly stacked flat leaf springs which are provided with an appropriate aperture along the optical axis of the lens system. Although the flat springs, as will be disclosed, provide a square aperture, it will be evident that they can be arranged such as to provide a circular aperture. The aperture provided by the mounting springs acts an an aperture or viewing window for the viewer through which the light rays emerge from the lens body towards the viewer. Consequently, when a circular aperture in the flat springs is provided, there results a circular viewing aperture or window.

The lens suspension springs are provided with mounting holes disposed two-by-two in separate planes and along axes crossing each other at a 90° angle, with a pair of mounting holes in one plane for attachment to the lens body and another pair of mounting holes for attachment to a support frame ring in turn rigidly mounted on the firearm, the geodesic transit or the like. In this manner, a free floating connection is effected between the lens body housing and the support ring which permits motion of one element relative to the other within a range determined by the spring design, and which is similar in action to a Cardan suspension.

Pre-stressing, or deflecting, of the flat springs is provided by several adjustment screws threading into the lens body barrel. The other end of the adjusting screws abuts against the support ring. In this manner, the springs between the lens barrel and the support ring are pre-loaded and the adjusting screws, by preloading the springs and acting as abutment means, control the range of possible motion of the spring suspension between the lens body and the support ring.

This arrangement also permits to adjust the optical axis of the lens body in azimuth and in elevation relative to its axes of symmetry, such as to accurately position the optical axis relative to the operational axis of the firearm or other device. Three adjustment screws are provided which are arranged relative to each other such that they are located each at an apex of a right triangle whose perpendicular sides are parallel to the axes of symmetry. For adjustment of the lens body in azimuth or in elevation, the screws at each end of the hypotenuse of the triangle are used while the third screw remains fixed. Through appropriate tightening or loosening of one of the two screws on the hypotenuse of the triangle the lens body can be precisely swiveled in elevation or azimuth within the course of the springs. The third screw at the apex of the triangle has only a holding function.

It will also be appreciated that the adjustment screws, at the same time, serve to preload the flat springs in addition to adjusting the alignment of the optical axis of the lens system, in such manner that for preloading of the flat springs all the adjustment screws are equally tightened, and, for adjusting the optical axis of the lens system, only one screw is tightened or loosened, thus causing the lens body to swivel about the axis formed by the opposite short side of the right angle triangle.

According to a further aspect of the present invention, the adjustment screws are arranged so that the geometric center of the flat springs is located within the triangle defined by the adjustment screws. Since it can be assumed that all effective and resulting forces acting upon the flat springs are applied at the geometric center of the springs, or spring center of gravity, it results, as can be readily seen, that the arrangement according to the present invention of the adjustment screws relative to the spring center of gravity provides at all times a stable balance or equilibrium, while providing an adjustment arrangement for the lens body which remains undisturbed even if a considerable motion is encountered, such as will occur with firearms having a powerful recoil.

Safe functioning and protection from adverse conditions is provided to the sighting device according to the present invention by enclosing the lens body, with appropriate clearance, in a protective tubing attached firmly to the front end of the support ring, the protective tubing extending forwardly and projecting beyond the front end face of the lens body. The protective tubing protects the lens from damages and resulting misalignments. At the same time, the protective tubing serves to screen out unwanted light.

U.S. Pat. No. 2,968,099 discloses a protective tubing for a sighting device. In the arrangement disclosed, however, the tubing is simply slipped over the outer end of the sighting device, so that unfavorable external influences affecting the tubing can also affect the sighting mechanism. Furthermore, the protective tubing is costly to manufacture. By comparison, the simple tubing provided by the present invention is not attached to the lens body itself but to the front end of the stable sturdy support ring in such manner as to provide a clearance space between the periphery of the lens body and the internal surface of the tubing. It can thus be seen that the arrangement according to the present invention prevents any external shock or vibration affecting the protective tubing from, as a rule, being transmitted to the lens body, since the tubing is attached to the lens support ring with a clearance space between the lens body and the tubing interior. A rear cover cap, also providing an aperture window, can be attached to the rear portion of the support ring, which presents the added advantage of masking any unwanted light from the ocular or eyepiece portion of the lens.

A particular advantage of the optical sight of the present invention, which at the same time provides the desired protection from unwanted outside influences, is particularly well adapted for use with firearms in which the whole optical sighting assembly is mounted within a rear extension of the firearm carrying handle, such that the lens body is aligned within a recess in the carrying handle which is parallel to the barrel of the firearm. Since the carrying handles are designed quite sturdily in view of their function, they provide, without additional expenditure, an optimum means of protection for the optical sighting device of the invention.

From the German published application No. 1,924,606 and corresponding U.S. Pat. No. 3,642,341 it is basically known that an optical sighting device may be incorporated in the handle of a firearm. In that disclosure, however, the optical sighting unit is built into that part of the handle which is usually gripped by the hand, thus making it necessary for that part to be designed quite large in order to accomodate a sighting device of large diameter. This causes the carrying handle to be higher than otherwise necessary, which presents a basic disadvantage. On the other hand, in such arrangement the space available for accomodating the sighting device within the handle is automatically limited by the size of the grip of the fingers. This in turn results in a smaller exit pupil for the sighting device which is an important disadvantage when compared to the present invention. In contrast, in the arrangement of the present invention the optical sighting device is not mounted directly in the inside of the handgrip portion of the carrying handle but, rather, in a rear extension of the carrying handle, i.e., at the portion of the handle provided with an opening forming a grip for the fingers. Thus, a carrying handle of minimum height is provided. Since the opening accomodating the fingers can be designed sufficiently high, the diameter of the exit pupil according to the present invention can be arbitrarily chosen to meet any requirement.

A further advantage of the invention is to provide a mounting or frame ring which is rigidly attached to the rear extension of the firearm carrying handle such that the rear extension of the handle houses the lens body with appropriate clearance. This arrangement provides an advantageous suspension of the lens body within the rear extension of the handle.

Another advantage of the invention consists in the rear extension of the handle extending at its forward portion considerably over the front portion of the lens body. Thus the frontal extension provides a hood or visor keeping out unwanted light without requiring additional components.

A further advantage of the present invention resides in the rear aperture window cap which is attached to the rear end of the rear extension of the carrying handle thus likewise helping to screen out unwanted light.

Further advantages of the present invention will become apparent to those skilled in the art when the following description of the best modes contemplated for practicing the invention is read in conjunction with the accompanying drawing wherein like reference numerals relate to like and equivalent parts, and in which:

BRIEF DESCRIPTION OF THE DRAWING

FIG. 1 is a schematic illustration, in cross section, of an optical sighting device according to the present invention as used as an optical sight for a firearm;

FIG. 2 is an enlarged view in section of the lens body portion of FIG. 1, for showing in detail the mounting and adjustment means, but provided with a modified support ring;

FIG. 3 is a transverse section along line I—I of FIG. 2;

FIG. 4 is a perspective view of a suspension spring for supporting the lens body of the invention; and FIG. 5 is a schematic illustration of an arrangement for mounting the optical sighting device of the invention within the carrying handle of a firearm.

DETAILED DESCRIPTION OF THE PREFERRED EMBODIMENTS

As shown at FIG. 1, an optical sighting device according to the present invention comprises a single main component consisting of a cylindrical lens body 1 made of a single piece of glass or like material. The lens body 1 is provided at each of its two frontal surfaces with an optically effective surface, each designated respectively by reference numerals 2 and 3, the surface 3 further including an appropriate target mark, in the form of a reticle, for example, not shown. Light rays originating from the target, of which only a pair of edge rays 4 and 5 are shown in the drawing for the sake of clarity, penetrate the lens body 1 in the direction of the arrows, are caused to converge by the first optically active surface 2 which acts as an objective lens and, upon emerging from the lens body 1, are caused by the optically active surface 3, acting as an ocular or eyepiece, to emerge again as a beam of parallel rays. A human eye 6 located behind the sighting device in the beam of parallel light rays observes without difficulty the enlarged image of the target and, through alignment of the target image with the center of the target mark, can aim with precision at the target any device on which the sighting device is mounted, such as a firearm.

For further detailed explanation of the optical characteristics of the invention permitting it to operate as a sighting device, reference is made to FIG. 2 which represents an enlarged, detailed partial view of FIG. 1, provided with a modified sighting device support ring, as will be explained in detail hereinafter. As clearly shown at FIG. 2, the two optically effective surfaces 2 and 3 are each in form of a spherically curved surface. The first surface 2 is convex for concentrating the light rays, while the second surface 3 is concave for deflecting the concentrated light rays back to a parallel light ray beam. In addition, the surface 2 is coated with a semi-transparent, semi-reflective mirror coating, while the surface 3 serves as a support on which is placed a diffusely reflective target mark, for example in the form of a reticle.

The two optically effective surfaces 2 and 3 are formed with a curvature radius and are disposed at such distance from each other along the optical axis 7 that the light rays reflected by the target mark disposed on the surface 3, after reflection on the first surface 2, are at least partially deflected so that they coincide with the light rays originating from the target which have been deflected upon entering the lens body 1. FIG. 2 shows the trajectory of a light ray from the target mark, for the sake of better illustrating the operation of the sighting device of the invention. A light ray, such as light ray 8 originating from infinity, via the target, parallel to the optical axis 7, impinges upon the first surface 2 at an angle $i$ of incidence relative to a perpendicular 9 to a tangent to the surface 2, and is refracted, in accordance with the laws of optics such that it leaves the surface 2 at an angle $i'$ relative to the perpendicular 9, whereby $i'$ is smaller than $i$. Simultaneously, the light impinging upon the first surface 2 illuminates the target mark on the surface 3 and the light hitting the target mark is reflected back towards the surface 2. At FIG. 2, a reflected light ray 10, originating from the target mark, is shown. The light ray 10 impinges upon the surface 2 at an angle $i''$ relative to the perpendicular 9 and is reflected by the semi-transparent mirror surface exactly under the same angle since due to the chosen diameter of the lens body 1 the angles $i'$ and $i''$ are equal. Thus, the light ray 10, after reflection on the surface 2, and the light ray 8 refracted by the surface 2, coincide exactly, forming the light ray 8' which is refracted upon impinging upon the surface 3. The surface 3 has a curvature which refracts the light ray 8' in such manner that it emerges from the lens body 1 parallel to the optical axis 7. This enables the viewer to see the target and the target mark at infinity with the same clarity.

In the example of the invention here illustrated and described in which the lens body 1 is made of crown glass, the magnification of the target, at an average distance from the firearm, is 1.26×. On the other hand, the target mark is seen under a magnifying glass magnification which depends on the thickness of the lens body 1 in the direction of the optical axis 7. For a chosen thickness of 30mm the resulting magnification of the target is about 10.5×. Consequently, the target mark which is disposed on the center of the optical surface 2 need not be relatively large. Due to the magnification of the target mark and to the fact that it is made of lines having only a few hundredth of millimeter in width, the target mark in no way obstructs the view through the lens body 1 and, furthermore, the target mark as seen on the optical surface 3 results only in a negligible loss of light.

In addition, the curvatures of the surfaces 2 and 3 and the actual thickness of the lens body 1 are arranged in relation to each other so that the resulting diameter $d$ of the exit pupil, which can be considered as the image as seen through the eyepiece, is notably larger than the pupil of the human eye 6, as shown at FIG. 1. In the example of structure illustrated the diameter $d$ of the exit pupil is 20mm.

During viewing of the target mark as projected onto the target line, the eye of the viewer needs not be positioned precisely either radially or axially. It is sufficient if the eye of the viewer is located somewhere within the bundle of light rays defining the exit pupil. This makes the aiming procedure particularly uncomplicated and extremely rapid as far as the optical sighting device of the present invention is concerned.

For the purpose of correcting the spherical aberration the distance between the optical surfaces 2 and 3 is determined such that the deviation angle of every single ray, over the total diameter $d$ of the exit pupil at three predetermined points, namely at a point located on the optical axis 7 and two diametrically opposed points located at the edge of the exit pupil, is zero absolutely, and in the areas between the optical axis and the edge of the exit pupil it is negligibly small. The required correction is easily obtained by way of conventional mathematical optical computation well known to those skilled in the art.

As illustrated at FIGS. 1 and 2, the lens body 1 is disposed in a cylindrical barrel or setting 11 in which it is held by means of a threaded ring 12. The barrel or setting 11 is in turn supported at its rear end by means of, for example, three parallelly disposed flat springs 13, 14 and 15, from a support ring 16 (FIG. 1) or 16' (FIG. 2) which in turn, is rigidly mounted on the firearm.

As shown more clearly by FIG. 3, the flat springs 13, 14 and 15 have a coaxial quandrangular periphery and form a coaxial quandrangular opening as viewed in the direction of the optical axis 7. The flat springs are bent in opposite directions relatively to a pair of axes of symmetry 17 and 18, disposed at an angle of 90° in separate planes, such as to provide a spring suspension having a predetermined amount of possible deflection. FIG. 4 illustrates in perspective one of such springs 13, 14 or 15. With reference to FIG. 4, it can be seen that if the axis of symmetry 18 is considered to be in the plane of the drawing, the spring 13, 14 or 15 has its sides bent downwardly such that the axis of symmetry 17 is below the plane of the drawing. Flat apertured mounting surfaces 19 and 20 are formed disposed along the axis of symmetry 17 and 18 respectively, such mounting surfaces being disposed in planes in which are located the portions of the springs farthest removed from each other.

As best shown at FIGS. 2 and 3, the springs 13, 14 and 15 are juxtaposed and function as the mounting means between the lens body 1 and the support ring 16', by means of srews 21 fastening the apertured mounting surfaces 20 on a side of the mounting ring 16', and by means of screws 22 fastening the apertured mounting surfaces 19 at the edge of the corresponding end of the lens fitting 11. The screws 21 and 22 are provided with appropriate lock washers to prevent loosening of the screws and the possible resulting misalignment of the optical sighting device of the invention due to recoil, for example, in firearms.

It can thus be seen that the lens body 1 is so suspended relative to the support ring 16' as to permit relative motion therebetween, only as limited by the spring stroke length, and which is quite similar to a Cardan suspension. The flat springs are adjustably preloaded by means of three adjustment screws 23, 24 and 25, each having an end threaded in an appropriate threaded aperture in the edge of the fitting 11 of the lens body 1. The screws 23, 24 and 25 are passed through appropriate apertures disposed in the support ring 16′, and the heads of the screws, with appropriate friction washers disposed therebelow, engage the opposite surface of the ring 16′, such that by rotation of the screws the lens fitting 11 may be pulled toward the mounting ring 16′ (FIG. 2) or 16 (FIG. 1). It is evident that tightening of the adjustment screws 23, 24, and 25 causes a corresponding axial compressing of the flat springs 13, 14 and 15.

Furthermore, the flat springs 13, 14 and 15 are arranged in such a manner that the axes of symmetry 17 and 18, in the operational position of the firearm, are disposed respectively horizontally and vertically. The three adjustment screws 23, 24 and 25 are relatively positioned such that they define a right angle triangle having its right angle sides 26 and 27 disposed parallel respectively to the axis of symmetry 17 and to the axis of symmetry 18 of the springs.

The adjustment of the lens body 1 in elevation and azimuth relative to the mounting ring 16 or 16′ is effected by the two adjusting screws 23 and 25 located on the hypotenuse 28 of the right angle triangle, while the third adjustment screw 24 remains fixed. More particularly, adjustment of the lens body in elevation is effected by means of the adjustment screw 25 whereby the lens body 1 is swung around the axis defined by the opposite shorter right angle side 26 of the triangle. On the other hand the lens body 1 is adjusted in azimuth by means of the adjustment screw 23 which causes a corresponding swinging or swiveling of the lens body about the axis defined by the other right angle side 27 of the triangle.

The recoil resulting from firing a firearm is directly opposite to the target direction. This means that the mounting ring 16 or 16′ experiences a sudden acceleration to the right, as shown in the drawing, which in turn causes, in view of the inertia of the lens body 1 and the lens barrel 11, a short jerking increase of the tensile force of the adjustment screws 23, 24 and 25. Since, during this time interval, however, the change in length of the adjusting screws 23, 24 and 25 remain practically zero, the flat springs 13, 14 and 15 keep their preloaded position and no change due to load increase takes place, with the exception of the increase of the loading tension applied to the adjusting screws 23, 24 and 25, such that the adjustment remains unchanged. The adjustment screws 23, 24 and 25 are arranged so that the geometric center 7 of the flat springs 13, 14 and 15, or the spring center of gravity, is located within the triangle defined by the adjustment screws 23, 24 and 25. Thus it can be assumed that all forces acting upon and resulting from the action of the flat springs 13, 14 and 15 are applied to the spring center of gravity 7, and there results, at all times, a constant stable equilibrium of the mounting means and adjustment means for the lens body 1, such equilibrium being even maintained under strong vibrations or stress, such as caused by the recoil of a firearm.

As illustrated at FIG. 1, the lens body 1 and its barrel or setting 11 are enclosed in a protective tubing 29, with a clearance space between the lens fitting and the protective tubing, the tubing being firmly attached to the front end of the mounting ring 16 and extending beyond the front end of the lens body 1. The protective tubing 29 shields and protects the lens body 1 against adverse external conditions and against the resulting misalignment, as well as masking it against undesirable light. For the same purpose there is provided a protective cap 30 which is screwed into, or otherwise fastened to, the rear end of the support ring 16.

In the embodiment of FIG. 5, the entire optical sighting device is mounted in the interior of a posterior extension of a carrying handle 31 of the firearm, so that the lens body 1 is substantially aligned with a recess providing a finger grip which is parallel to the barrel of the firearm. In this manner, the support ring 16 of FIG. 1, or 16′ of FIG. 2, or the equivalent thereof, is firmly mounted on the rear extension of the carrying handle 31 so that the extension houses the lens body 1 with appropriate peripheral clearance. In the arrangement of FIG. 5, there is thus provided an optimum of protection against the ambiant and external effects for the sighting device of the invention, together with a most advantageous suspension means for the lens body 1, thus preventing possible misalignments.

In order to exclude undesirable light, the rear extension of the carrying handle 31, which is closed around its entire periphery, extends substantially over the frontal portion of the lens body 1. For the same purpose, a protective cap 32 is mounted on the rear of the carrying handle extension 31. In every other respect, the sighting device illustrated at FIG. 5 is alike the hereinbefore described embodiment.

It is therefore readily apparent that the optical sighting device of the invention is simple in design and can be manufactured at low cost. It can be designed as an integral portion of a firearm which is simply, quickly and easily installed, and it can also be used for mounting on firearms already in existence, without any difficulty.

Having thus described the present invention by way of typical structural examples thereof, modifications whereof will be readily apparent to those skilled in the art, what is claimed as new is as follows:

1. In an optical sight wherein a target is sighted through a telescope-like optical device provided with an objective portion and an ocular portion, and wherein a target mark disposed within said optical device is projected into the infinite such as to be seen in a single plane with said target, said telescope-like optical device having a convex optically effective objective first surface for converging parallel light rays emitted from the target, a concave optically effective second surface for parallel re-alignment of the converged light rays, a target mark on said second surface, and a semi-transparent mirror surface disposed in said optical device whereby said target mark is projected onto said semi-transparent mirror surface and reflected thereby, the improvement comprising said telescope-like optical device formed as a single homogeneous lens body made of light-transmitting material having said optically effective first surface formed by a frontal surface of said lens body, said semi-transparent mirror surface being disposed directly on said frontal surface, and a cylindrical barrel enclosing said lens body, said barrel being mounted on a mounting ring by means of at least one quadrangular flat spring defining a substantially square aperture coaxial with said lens optical axis.

2. The optical sight of claim 1 wherein the improvement further comprises each optically effective surface having such curvature and the two surfaces being disposed at such distance from each other that the light rays reflected from the target mark are at least partially reflected upon impinging upon the mirror coating on said first surface in such way that they coincide with the rays originating from the target and converged by said first surface.

3. The optical sight of claim 1 wherein the improvement further comprises each optically effective surface having such curvature and the two surfaces being situated at such distance from each other that the diameter of the exit pupil of said second surface is wider than the pupil of the human eye.

4. The optical sight of claim 3 wherein the diameter of the exit pupil is in the range of 15–25mm.

5. The optical sight of claim 4 wherein the diameter of the exit pupil is 20mm.

6. The optical sight of claim 1 wherein the improvement further comprises a correction of spherical aberration by determining the distance between said first and second optically effective surfaces such that the deviation angle for each single ray over the total diameter of the exit pupil at least on three points located respectively on said lens body optical axis and two diametrically disposed edge points is zero and negligible therebetween.

7. The optical sight of claim 1 wherein said flat spring has a pair of diametrically opposed mounting surfaces disposed in a first common plane and a pair of diametrically opposed mounting surfaces disposed in a second common plane spaced apart from said first common plane, said mounting surfaces being respectively attached to said lens barrel and to a fixed support mount for said lens body.

8. The optical sight of claim 7 wherein said spring is preloaded by way of adjustment screws disposed between said lens barrel and said mount.

9. The optical sight of claim 8 wherein the adjustment screws engage the mount such as to pull the lens barrel toward said mount.

10. The optical sight of claim 9 wherein the axes of symmetry of said spring disposed in said separate planes are substantially at right angles to each other.

11. The optical sight of claim 10 wherein said adjustment screws are disposed relative to each other such as to define a right angle triangle having its right angled sides parallel to said axes of symmetry.

12. The optical sight of claim 11 wherein the azimuth and elevation position of said lens body is adjustable by way of the adjustment screws disposed at the hypotenuse of said right angle triangle.

13. The optical sight of claim 11 wherein said adjustment screws are disposed such that the geometric center of said spring is within the right angle triangle defined by said adjustment screws.

14. The optical sight of claim 1 wherein the improvement further comprises a protective tubing surrounding said cylindrical barrel and defining a clearance space between the periphery of said cylindrical barrel and the surrounding portion of said protective tubing, said protective tubing being attached to said mounting ring and forwardly extending beyond the front of said lens body.

15. The optical sight of claim 1 further comprising an apertured cap mounted on the rear of said mounting ring.

16. The optical sight of claim 1 mounted on the interior of a posterior extension of a carrying handle of a firearm, said carrying handle having a recess provided for finger grip aligned with the barrel of said firearm.

17. The optical sight of claim 16 wherein said cylindrical barrel is supported by a support ring attached to said posterior extension such that said posterior extension surrounds said cylindrical barrel with a space clearance.

18. The optical sight of claim 17 wherein said posterior extension of said carrying handle extends substantially over the frontal part of said lens body.

19. The optical sight of claim 18 further comprising an apertured cap attached to the rear extension of said carrying handle.

* * * * *